United States Patent
Kawashima

(10) Patent No.: US 6,379,808 B2
(45) Date of Patent: *Apr. 30, 2002

(54) PHOTOCHROMIC FILM COMPRISING A GAS BARRIER DEPOSITION FILM

(75) Inventor: Tadasu Kawashima, Tochigi (JP)

(73) Assignee: Sony Chemicals Corporation, Kanuma (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,690

(22) Filed: Apr. 2, 1998

(30) Foreign Application Priority Data

Apr. 3, 1997 (JP) ............................... 9-084747

(51) Int. Cl.[7] .......................... B32B 15/04; B32B 27/32
(52) U.S. Cl. ...................... 428/457; 428/500; 428/521; 428/913
(58) Field of Search ................................ 428/913, 457, 428/521, 500

(56) References Cited

U.S. PATENT DOCUMENTS

| 3,716,489 A | * | 2/1973 | DeLapp | 252/300 |
|---|---|---|---|---|
| 3,968,051 A | * | 7/1976 | Stamm et al. | 252/300 |
| 4,367,170 A | * | 1/1983 | Uhlmann et al. | 252/586 |
| 4,528,234 A | * | 7/1985 | Kaiho et al. | 428/216 |
| 4,618,213 A | * | 10/1986 | Chen | 350/96.34 |
| 4,968,454 A | * | 11/1990 | Crano et al. | 252/586 |
| 5,017,225 A | * | 5/1991 | Nakanishi et al. | 106/21 |
| 5,417,816 A | * | 5/1995 | Nakashima et al. | 204/96 |
| 5,468,803 A | * | 11/1995 | Takahashi et al. | 534/553 |
| 5,725,958 A | * | 3/1998 | Matsuda et al. | 428/446 |
| 5,728,770 A | * | 3/1998 | Yamamoto et al. | 524/55 |
| 6,013,363 A | * | 1/2000 | Takahashi et al. | 428/315.9 |

FOREIGN PATENT DOCUMENTS

| BE | 1007885 A6 | * | 11/1995 |
|---|---|---|---|
| JP | A 58-34437 | | 2/1983 |
| JP | A 61-22327 | | 1/1986 |
| JP | 61022327 | * | 1/1986 |
| JP | A 50110/89 | | 3/1989 |
| JP | A 6-192651 | | 7/1994 |

* cited by examiner

Primary Examiner—Blaine Copenheaver
Assistant Examiner—Kevin R Kruer
(74) Attorney, Agent, or Firm—Rosenthal & Osha L.L.P.

(57) ABSTRACT

It is an object of the present invention to provide a highly durable photochromic film retaining a photochromic activity for a long time even when used under high temperture and high humidity conditions. A durable photochromic film comprising a coloring material layer containing a photochromic material and a phototransmissive deposition film laminated to said coloring material layer is disclosed.

8 Claims, 1 Drawing Sheet

PHOTOCHROMIC FILM COMPRISING A GAS BARRIER DEPOSITION FILM

BACKGROUND OF THE INVENTION

1. Field of the Invention

The present invention relates to a photochromic film having a photochromic activity to develop or change color by exposure to light, and more specifically, it relates to a durable photochromic film retaining said photochromic activity for a long time.

2. Description of the Prior Art

There have previously been well known so-called photochromic materials which absorb light in the UV region to develop or change color and fade color when UV rays are shut out.

Photochromic products in the form of a thin plate incorporating such a photochromic material in a resin binder sandwiched between glasses have widely been used in glasses for automobiles, glazings, etc. (for example, see JUA No. 50110/89).

However, the conventional photochromic products could not retain the unique activity of photochromics which develop or change color by exposure to light. Particularly when used outdoors during summer, the product life was shortened.

We investigated the cause of the above problem and found that photochromic materials deteriorate by contact with heat, oxygen and moisture, particularly oxygen in addition to exposure to UV rays. Particularly when used under high temperature and high humidity conditions, photochromic materials rapidly deteriorated.

Accordingly, an object of the present invention is to provide a highly durable photochromic film retaining a photochromic activity for a long time even when used under high temperature and high humidity conditions.

SUMMARY OF THE INVENTION

In order to attain the above object, the present invention provides a durable photochromic film comprising a coloring material layer containing a photochromic material and a phototransmissive deposition film laminated to said coloring material layer.

The present invention also provides a durable photochromic film wherein said deposition film is laminated to each side of said coloring material layer.

The present invention further provides a durable photochromic film wherein said deposition film has oxygen permeability of 0.5 (cc/m$^2$.day.atm) or less when a polyolefin film is laminated to each face of said deposition film.

According to the present invention, the coloring material layer consisting of a photochromic material and a base polymer is protected by the phototransmissive deposition film.

Namely, the phototransmissive deposition film is permeable to UV rays to retain the photochromic activity. The deposition film as a whole has low oxygen permeability by the presence of the deposit to prevent a photochromic material in the coloring material layer from coming into contact with oxygen and thus can retain the photochromic activity.

Unlike saran resins or ethylene resins previously known as oxygen barrier films, the phototransmissive deposition film according to the present invention does not increase the oxygen permeability or vapor permeability with variation of the environmental temperature used.

Therefore, the photochromic film according to the present invention can retain the photochromic activity for a long time even when it is used under high temperature and high humidity conditions.

DETAILED DESCRIPTION OF THE INVENTION

Figure 1:
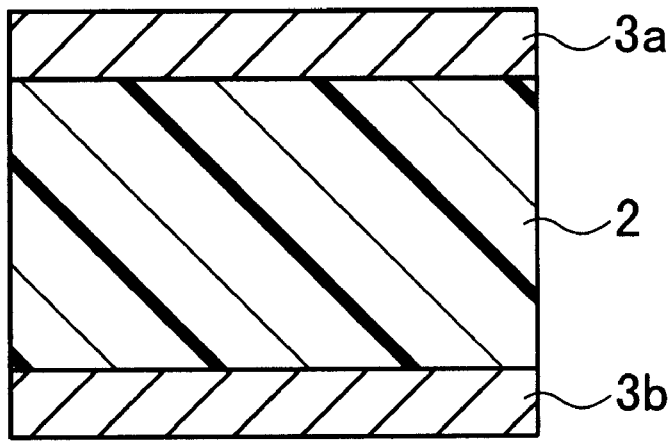
FIG. 1 shows a cross-section of a durable photochromic film according to the present invention.

A photochromic film according to the present invention generally comprises a coloring material layer 2 containing a photochromic material and phototransmissive deposition films 3a, 3b laminated to each side of said coloring material layer, as shown in FIG. 1. If the photochromic film is to be adhered to a substrate with low oxygen permeability such as glass, the deposition film on the substrate side may be omitted.

Figure 2:
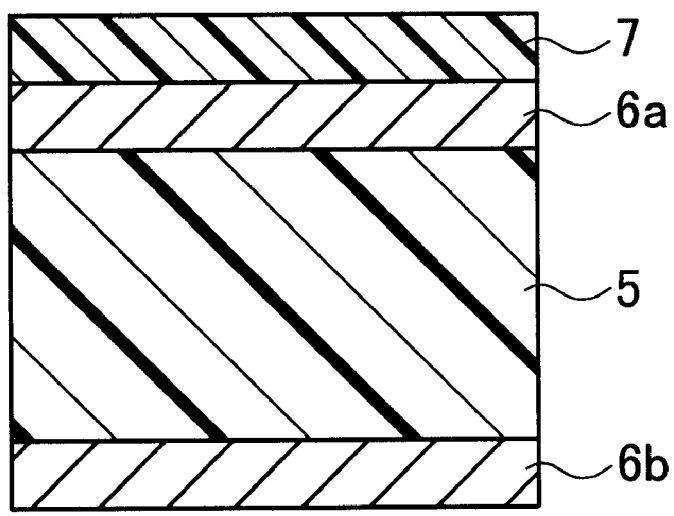
FIG. 2 shows another cross-section of a durable photochromic film according to the present invention; wherein 1, 4 represent a durable photochromic film, 2, 5 represent a coloring material layer, 3a, 3b, 6a, 6b represent a phototransmissive deposition film, and 7 represents an adhesive layer (self-adhesive layer).

Then, the photochromic film according to the present invention may be adhered to a substrate via an adhesive layer 7 formed on any one face of the deposition films 6a, 6b as shown in FIG. 2.

In an embodiment not shown, the adhesive layer 7 may be formed on each face of the deposition films 6a, 6b. When the deposition film 6a or 6b is to be laminated to only one side of the coloring material layer 5, the adhesive layer 7 may conveniently be formed on the side of the coloring material layer 5.

Now, the photochromic film 4 shown in FIG. 2 is specifically explained.

The coloring material layer 5 in the photochromic film 4 according to the present invention consists of a photochromic material and a base polymer.

The photochromic material is not specifically limited but may be chosen from any known types. Specific examples may include organic photochromic materials such as azobenzene compounds, thioindigo compounds, spiropyran compounds, fulgide compounds, triphenylmethane compounds, spirooxazine compounds, viologen compounds, salicyldineanil compounds, etc.

The base polymer is also non-limitative but may be chosen from any known types. Specific examples may include rubber resins, polyester resins, polyurethane resins, polyether resins, polycarbonate resins, fluorine resins, silicone resins, acrylic resins, styrene resins, etc.

Among these base polymers, rubber resins which show a weight gain of 1% or less, more preferably 0.1% or less after immersion in water at 23° C. for 24 hours according to ASTM D570 are preferred in terms of humidity resistance. Among said rubber resins, so-called hydrogenated rubber resins in which hydrogen are added in the molecules are preferred in terms of weather resistance. Specifically, styrene co-polymers such as SEBS (styrene-ethylenebutylene-styrene), SEPS (styrene-ethylene-propylene-styrene) may be mentioned.

The thickness of the coloring material layer 5 consisting of these photochromic material and base polymer is not specifically limited, but generally ranges from 5 to 100 microns.

The deposition film 6a or 6b consists of a base and a deposition layer.

The base may be a phototransmissive plastic film such as resin films including polyester, polyethylene, polypropylene, nylon, etc. The base may be preliminarily surface-treated by corona, plasma or other means to facilitate adhesion of the deposition layer to the base.

The deposition layer can be formed by conventional techniques, such as vacuum deposition, ion plating, sputtering, plasma deposition, CDV.

The deposit may be a silicon oxide, a metal or a metal oxide such as ITO (Indium Tin Oxide), titanium oxide and aluminium oxide.

The deposition films 6a, 6b according to the present invention must have a sufficient phototransmissivity and low oxygen permeability.

The phototransmissivity can be expressed as a transmissivity, practically of 15% or more. If the transmissivity is less than 15%, any color development or color change of the photochromic material can not be seen through the deposition film. When the transmissivity is low, UV rays can not readily penetrate the deposition film so that the photochromic material can not sufficiently develop or change color.

In order to keep the above transmissivity, the thickness of the deposition layer should be controlled at 100 to 10000 angstroms.

It is also required that the deposition films 6a, 6b should have low oxygen permeability and should not increase said oxygen permeability with variation of the environmental temperature used.

The present invention may be effective if the deposition film has oxygen permeability of 0.5 ($cc/m^2.day.atm$) or less when a polyolefin film is laminated to each face of the deposition film in a temperature range from normal temperatures to the temperatures at which photochromic films are usually used (about 40° C.). The vapor permeability is preferably 0.5 ($g/m^2.day$) or less.

Deposition films with such properties are commercially available, such as "TEC BARRIER" series made by Mitsubishi Chemical Corp. or "MOS film" series made by Oike Industry Corp.

The adhesive layer 7 to be adhered to a substrate is not specifically limited but may be chosen from any known types.

Examples include acrylic resins, methacrylic resins, epoxy resins, polyurethane resins, polyester resins, rubber resins or petroleum resins.

The above-described photochromic film according to the present invention can be prepared by the following process, for example.

A coloring material layer solution containing a photochromic material and a base polymer dissolved in a solvent is prepared and coated on a release film, and the solvent is dried off to form a coloring material layer.

Then, a deposition film is faced to one surface of said coloring material layer and both are laminated.

Said release film is released and a deposition film is laminated to the other surface of the coloring material layer to obtain an intended photochromic film. Alternatively, an intended photochromic film can be obtained by directly coating a coloring material layer solution on a deposition film without using a release film to form a coloring material layer and laminating another deposition film on a surface of said coloring material layer.

The coloring material layer may also be formed by providing a film of a base polymer incorporating a photochromic material, instead of coating a solution as described above.

Then, an adhesive layer may be directly coated on the resulting photochromic film described above or laminated to a preformed deposition film.

The following examples illustrate the present invention more in detail.

EXAMPLES

Example 1

0.3 Parts by weight of a spirooxazine dye (PH1 available from Hodogaya Chemical Co., Ltd.) as a photochromic material, and 15 parts by weight of SEBS (available from Asahi Chemical Industry Co., Ltd.) and 15 parts by weight of a petroleum resin as base polymers were combined with a solvent to prepare 100 parts by weight of a coloring material layer solution. Then, this coloring material layer solution was coated on a release film having a release layer of 1 micron using a roll coater and the solvent was dried off to obtain an intended coloring material layer. The resulting coloring material layer had a thickness of 50 microns.

Then, laminating procedures took place by bringing a polyester deposition film (TEC BARRIER S available from Mitsubishi Chemical Corp.) of 12 microns in thickness having an $SiO_2$ deposition layer of 500 angstroms into contact with a surface of said coloring material layer with heating at 100° C.

Then, said release film was released to bare the other surface of the coloring material layer, thereafter laminating procedures took place in the same manner as above by bringing a deposition film into contact with said other surface of the coloring material layer with heating at 100° C. to prepare an intended photochromic film.

The oxygen permeability and vapor permeability of the deposition film used in this example vs. temperature change are shown in Table 1.
(Evaluation)
Accelerated Weathering Test:

The photochromic film obtained as above was left in a fadeometer and exposed to UV rays. The time by which the absorbance of said film at 550 nm deteriorated to 50% or less was determined.

Here, an absorbance of 50% or less means that the photochromic film develops or changes color too slightly to practically have a commercial value.

The atmosphere in the fadeometer was established under high temperature and high humidity conditions of 40° C. and a humidity of 80%.
(Results)

The results showed that an absorbance of 50% or more could be kept for a period as long as 200 hours.

Comparative Example 1

In Comparative example 1, a photochromic film was prepared similarly to Example 1 except that the deposition film of Example 1 was replaced by an ethylene resin film (EVOH available from Kuraray Co., Ltd.) among conventional non-deposition oxygen barrier films, and evaluated similarly to Example 1.
(Results)

The results showed that the absorbance was lowered to less than 50% in 100 hours.

Examples 2 and 3 and Comparative Examples 2 and 3

In Example 2, a photochromic film was prepared similarly to Example 1 except that the deposition layer in the deposition film of Example 1 was replaced by ITO of 200 angstroms in thickness, and evaluated similarly to Example 1.

In Example 3, a photochromic film was prepared similarly to Example 1 except that the deposition layer in the deposition film of Example 1 was replaced by aluminium of 150 angstroms in thickness, and evaluated similarly to Example 1.

In Comparative example 2, a photochromic film was prepared similarly to Example 1 except that the deposition film of Example 1 was replaced by a saran resin film of 20 microns in thickness among conventional non-deposition oxygen barrier films, and evaluated similarly to Example 1.

In Comparative example 3, a photochromic film was prepared similarly to Example 1 except that the deposition film of Example 1 was replaced by a polyester film of 50 microns in thickness, and evaluated similarly to Example 1.

The oxygen permeability and vapor permeability of each film used in Comparative examples 1 and 2 vs. temperature change are shown in Table 1.

(Results)

Examples 2 and 3 kept an absorbance of 50% or more for a period as long as 200 hours, similarly to Example 1.

The absorbance declined to less than 50% in 50 hours in Comparative example 2 and 100 hours in Comparative example 3.

TABLE 1

| Film for protecting a coloring material layer | Deposit | Oxygen permeability[1] at various temperatures ($cc/m^2$. day. atm) | | | Vapor permeability (40° C., 90%) ($g/m^2$. day) |
|---|---|---|---|---|---|
| | | 23° C. (90%) | 30° C. (71%) | 42° C. (38%) | |
| Example 1 | Deposition film | $SiO_2$ | 0.13 | 0.15 | 0.47 | 0.3 |
| Comparative example 1 | Ethylene resin film | None | 1.51 | 3.52 | 20.5 | 2.6 |
| Comparative example 2 | Saran resin film | None | 0.60 | 0.96 | 2.92 | 0.9 |

[1]The value in parentheses represents the relative humidity at the temperature indicated.

ADVANTAGES OF THE INVENTION

The photochromic film according to the present invention, which comprises a coloring material layer containing a photochromic material and a phototransmissive deposition film laminated to said coloring material layer, shows a photochromic activity to develop or change color in response to UV rays passed through the deposition film face and absorbed into the photochromic material. Moreover, the deposition film according to the present invention can retain the photochromic activity because it does not increase the oxygen permeability with temperature change.

What is claimed is:

1. A durable photochromic film comprising:
    a coloring material layer and a phototransmissive deposition film laminated to the coloring material layer;
    the coloring material layer comprising a base polymer and a photochromic material, wherein said coloring material layer has a thickness from 5 to 100 microns, and wherein said base polymer is selected from the group consisting of styrene-ethylene-butylene-styrene and styrene-ethylene-propylene-styrene;
    the phototransmissive deposition film comprising a base and a deposition layer adhered to the base, the base comprising a phototransmissive plastic film, wherein the phototransmissive plastic film comprises a material selected from the group consisting of polyester, polyethylene, polypropylene and nylon and the deposition layer is selected from the group consisting of indium tin oxide and titanium oxide.

2. The durable photochromic film according to claim 1, wherein the deposition layer has a thickness ranging from 100 angstroms to 10,000 angstroms.

3. The durable photochromic film according to claim 1, wherein the phototransmissive deposition film has an oxygen permeability of 0.5 ($cc/m^2$.day.atm) or less when a polyolefin film is laminated to each face of the deposition film.

4. The durable photochromic film according to claim 1, wherein the photochromic material is selected from the group consisting of azobenzene compounds, thioindigo compounds, spiropyran compounds, fulgide compounds, triphenylmethane compounds, spirooxazine compounds, viologen compounds and salicyldineanil compounds.

5. A durable photochromic film comprising:
    a coloring material layer and a phototransmissive deposition film laminated to each side of the coloring material layer; the coloring material layer comprising a base polymer and a photochromic material, wherein said coloring material layer has a thickness from 5 to 100 microns, and wherein said base polymer is selected from the group consisting of styrene-ethylene-butylene-styrene and styrene-ethylene-propylene-styrene; the phototransmissive deposition film comprising a base and a deposition layer adhered to the base, the base comprising a phototransmissive plastic film wherein the phototransmissive plastic film comprises a material selected from the group consisting of polyester, polyethylene, polypropylene and nylon and the deposition layer is selected from the group consisting of indium tin oxide and titanium oxide.

6. The durable photochromic film according to claim 5, wherein the phototransmissive plastic film has a thickness ranging from 100 angstroms to 10,000 angstroms.

7. The durable photochromic film according to claim 5, wherein the phototransmissive deposition film has an oxygen permeability of 0.5 ($cc/m^2$.day.atm) or less when a polyolefin film is laminated to each face of the deposition film.

8. The durable photochromic film according to claim 5, wherein the photochromic material is selected from the group consisting of azobenzene compounds, thioindigo compounds, spiropyran compounds, fulgide compounds, triphenylmethane compounds, spirooxazine compounds, viologen compounds and salicyldineanil compounds.

* * * * *